S. CUSTER.
Compass.
No. 66,805.
Patented July 16, 1867.
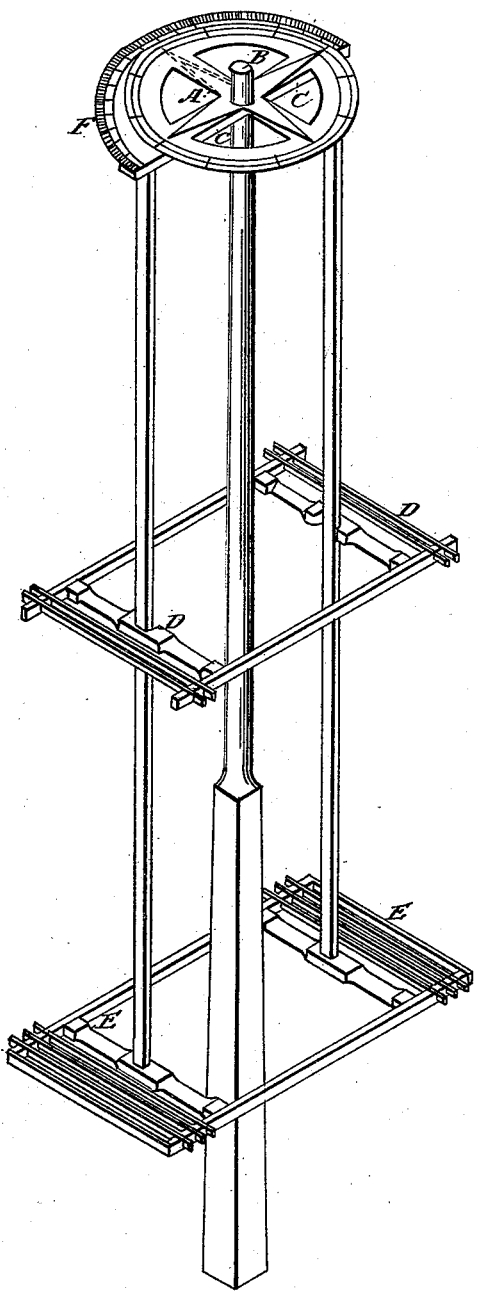
INVENTOR:
Sam Custer

United States Patent Office.

SAMUEL CUSTER, OF SALEM, VIRGINIA.

*Letters Patent No. 66,805, dated July 16, 1867; antedated July 12, 1867.*

IMPROVEMENT IN MARINERS' COMPASSES.

The Schedule referred to in these Letters Patent and making part of the same.

TO ALL WHOM IT MAY CONCERN:

Be it known that I, SAMUEL CUSTER, of Salem, in the county of Roanoke, State of Virginia, have made a new and useful Improvement in Mariners' Compasses; and I do hereby declare the following to be a full, clear, and exact description of the nature and construction and operation of the same, sufficient to enable one skilled in the art to which it appertains to construct and use the same, reference being had to the accompanying drawings, which are made part of this specification, and in which my improvement is represented by perspective view.

My invention consists of a battery of two or more magnets, to be attached to the axle or suspending arrangement by which motion is communicated from the lower or main battery to the card above. This battery will occupy an intermediate position between the lower or main battery and the upper or main directive needle to be adjusted up or down between them, to be parallel with the main battery below, and to be so attached to the axle or suspending arrangement of the lower battery that it will move in the same plane with it, and to be subject to the same direction of motion. The purpose of the adjustable intermediate battery is to correct the upper or main directive needle by repulsion in a contrary direction to that in which it may be moved by any local magnetic force. It also consists in the construction of the upper or main directing needle, which has two bars parallel to each other, with similar poles in same direction, corresponding to and parallel with the correcting battery below when there is no disturbing cause to move them from the magnetic meridian. The purpose of the construction is to secure the repulsive influence of a correcting battery when the parallel has broken the advance motion of the correcting battery, a result of the magnetic law of distance that may intervene between the upper or main directive needle and the lower or main moving battery. It is by the result of distance that the corrective battery is moved in advance of the main needle, and thereby gets the position to oppose, by repulsion and attraction, the tendency of the main needle to move in the same direction. Also the suspension of the main needle should be attached to the battery-frame, and concentric to the card that moves with it. The cards of needle and battery should be adjustable to compensate for difference in polar intensity of the magnet. Also the combination of the two cards, from which the difference in the conduct of the upper and lower arrangements can be read, and thereby determine the amount of local disturbance.

The comparative action of the above-described arrangement is that the lower or main moving battery has all the features of an ordinary compass, will traverse correctly, will be subject to disturbing local magnetic influence as the common compass in the same position. But the construction affords the means by which the result of the law of distance can be compared. In separating the lower moving battery three or four feet from the upper or main directive needle, a difference in amount of reflection must result, which will move the corrective battery in position to counteract the force that will tend to move the main directive needle in the same direction.

In the drawing, A is the main directive needle, suspended upon the point at B, fixed in the frame C C. D is the correcting battery, made adjustable up or down the frame or axle by any mechanical device by which the same can be effected, so as to arrive at the position necessary to proper correction. A change of position, and also change of direction and intensity of local disturbing causes, require a corresponding change in the correcting battery, either to be placed nearer to or further from the main needle, or up or down, as the case may require. The horizontal position necessary to correction is self-adjusting, being moved into position by the lower battery, a result derived from the direction and intensity of the local force. Magnetic corrections as heretofore used change their position with the ship. In my improvement the local magnetism gives the position to the correcting magnets, moving them in a horizontal plane. The perpendicular is obtained by adjustment. E is main moving battery, constructed of a number of magnets, placed parallel in a frame connected with the card F. The purpose is to effect the horizontal adjustment of the correcting battery, and, in consequence of its lower position, will move in advance of the main directive needle, and thereby effect the necessary connection by repulsion.

Having in the description of my invention shown that the purpose of the lower or main battery is to move the correcting battery above it in position to correct main directive needle.

Having described my invention, what I claim therein as new, and desire to secure by Letters Patent, is—

1. The combination of the lower battery magnet with the correcting battery above it, substantially as and for the purpose described.

2. The combination of the correcting battery with the upper or main directive needle, as well as the arrangement of adjustment position of magnets, as and for the purpose described.

3. The combination of the main directive needle with the correcting battery below it, under its arrangement of two or more magnets, as and for the purpose herein described.

SAML. CUSTER.

Witnesses:
A. E. HUFF,
W. P. HUFF.